A. RUCH.
SCALE.
APPLICATION FILED OCT. 9, 1911.
1,022,264.
Patented Apr. 2, 1912.
2 SHEETS—SHEET 2.
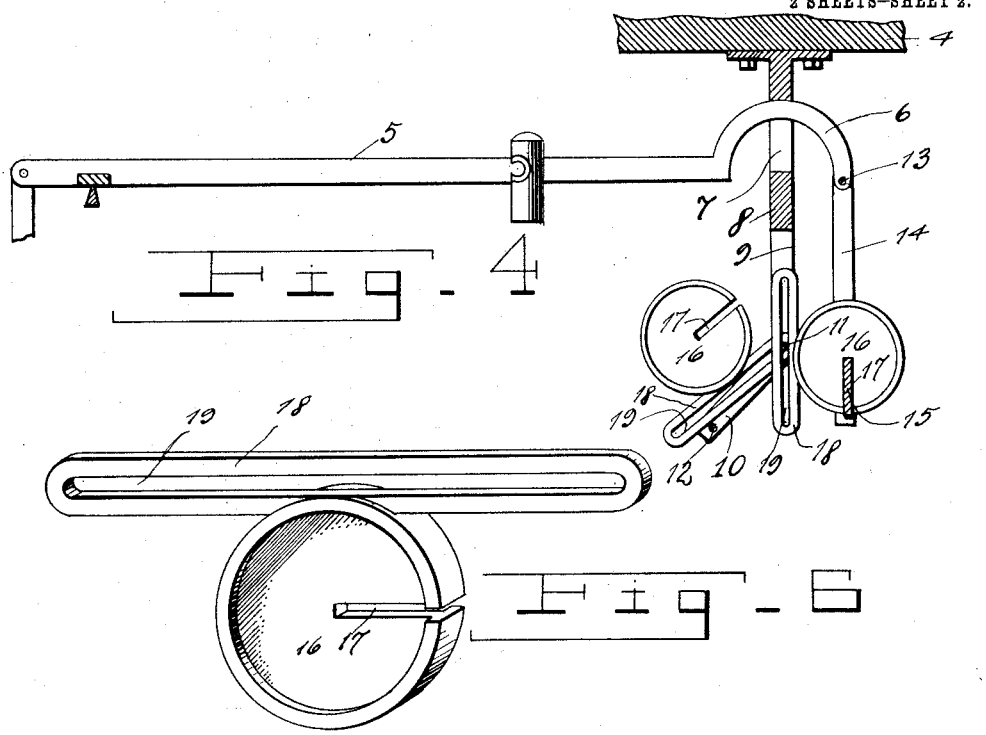
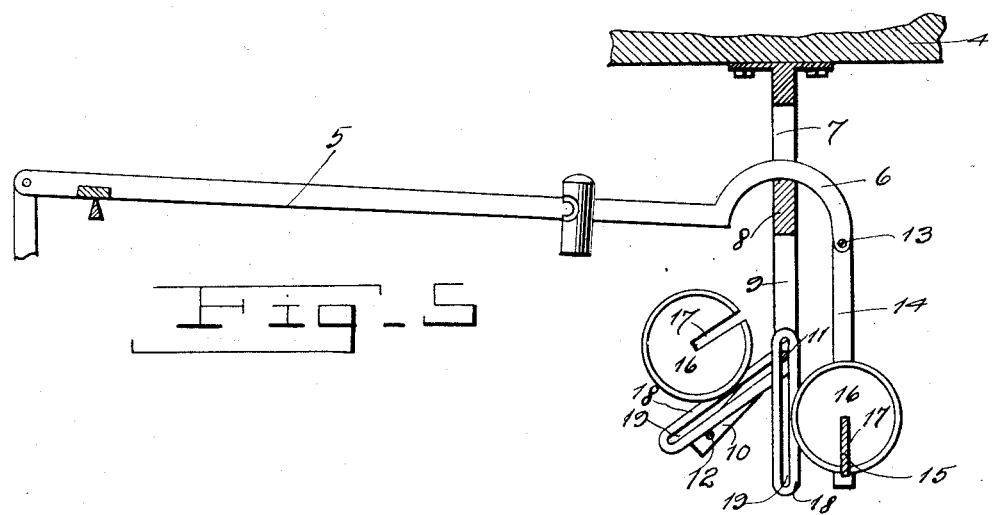
Witnesses
Herbert H. Parter
H. K. Parsons
Inventor
A. Ruch
By Harry Ellis Chandler
Attorney

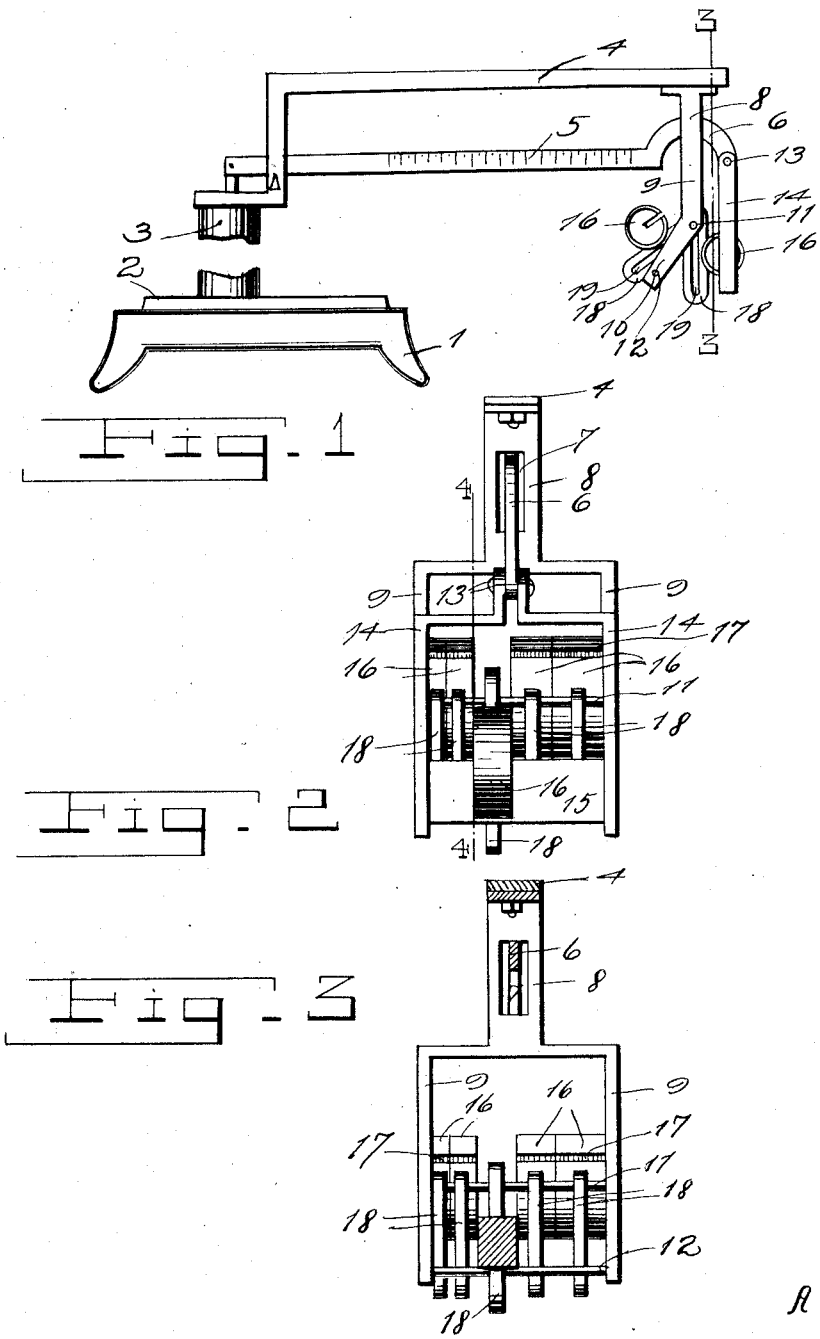
A. RUCH.
SCALE.
APPLICATION FILED OCT. 9, 1911.
1,022,264.
Patented Apr. 2, 1912.
2 SHEETS—SHEET 1.

UNITED STATES PATENT OFFICE.

ALFRED RUCH, OF MINDEN, IOWA.

SCALE.

1,022,264.

Specification of Letters Patent.

Patented Apr. 2, 1912.

Application filed October 9, 1911. Serial No. 653,649.

*To all whom it may concern:*

Be it known that I, ALFRED RUCH, a citizen of the United States, residing at Minden, in the county of Pottawattamie and State of Iowa, have invented certain new and useful Improvements in Scales, of which the following is a specification.

My invention relates to improvements in scales, and has for its leading object the provision of an improved scale of that type commonly known as platform scales in which the weights will be at all times held near the end of the balance beam and in which there will be no danger of the weights being mislaid or lost as is now frequently the case.

The further object of my invention is the provision of an improved scale and of balancing weights for use on said scale so disposed that it will be absolutely impossible to employ other than the right weight on the scale and consequently customers may be sure that standard weights which have been tested by the inspector of weights and measures are being used instead of other false weights such as are sometimes employed on ordinary scales.

Other objects and advantages of my improved scales will be readily apparent by reference to the following description taken in connection with the accompanying drawings, and it will be understood that I may make any modifications in the specific structure shown and described within the scope of my claims without departing from or exceeding the spirit of my invention.

Figure 1 represents a front view of a scale equipped with my improved weight supporting and receiving devices. Fig. 2 represents an enlarged end view of the device. Fig. 3 represents a sectional view on the line 3—3 of Fig. 1. Fig. 4 represents a sectional view on the line 4—4 of Fig. 2 showing the position of the weight in use when the same is too light to balance the weight on the platform of the scales. Fig. 5 represents a similar view showing the weight in balancing position, and Fig. 6 represents a perspective view of one of the weights.

In the drawings, the numeral 1 designates the base of a scale having secured thereon the platform 2, while rising from the base is the support 3 having the lateral extension 4 beneath which is disposed the scale beam 5 connected through the interior of the support 3 with the platform 2 in the usual manner. As is customary said beam 5 has a hooked end 6 slidable in the slot 7 of the bracket 8 which is secured to and depends from the extension 4. Said bracket 8 continues downward in a yoke having the parallel arms 9 having an obtusely bent portion 10 at the lower ends thereof, a rod or bolt 11 connecting the two arms of the yoke at the bend and a second rod 12 connecting their lower ends. Depending from the pivot bolt or rivet 13 secured in the end of the hook 6 are the diverging yoke arms 14 for receiving the usual balancing weights, said arms being connected by the flat bar 15.

To balance a weight on the platform 2 of the scale, I employ the weights 16 each having a slot 17 to receive the bar 15, each of said weights being further formed with an elongated projection disposed tangentially of its weight. Said projection 18 has a slot 19 extending longitudinally thereof in which the bolt 11 is slidably engaged.

In the use of my improved weights, I normally so dispose the same that the projections 18 rest on the bolt 12 which serves to support the weights and prevent swinging thereof. When it is desired to use any of the weights, it is merely necessary to swing the same upward and around until the bar 15 can be engaged in the slot 17 of the weight. When in this position, movement of the scale beam will raise or lower the scale beam and the bolt 11 will ride loosely in the slot 19 which is sufficiently wide to eliminate binding against the bolt.

From the foregoing description taken in connection with the accompanying drawings the construction and use of my improved scale and weights therefor will be readily apparent, and it will be seen that I have provided a simple and efficient means for satisfactorily holding the correct weights adjacent the receiving bar of the scale beam in such manner that the weights cannot become lost but are at all times in position for convenient use and by being held in this position eliminate the possibility of substituting false weights temporarily.

I claim:

1. The combination with the beam protecting arm of a beam scale, of a bracket depending therefrom and having a portion providing a guide for the beam, arms depending from the bracket, a pair of bolts connecting the arms, and weights having slotted extensions slidably engaged on one of the bolts and normally resting against the other of said bolts.

2. In a beam scale, the combination with the beam protecting arm, of a guide bracket for the beam depending from said arm, a yoke projecting downward from the guide bracket, a pair of bolts connecting the arms of the yoke, weights having slotted extensions slidably engaged on one of the bolts and normally resting on the other, and a receiving yoke pivoted to the beam and having a bar connecting its arms, the weights each having a slot formed therein to receive the bar when the weights are swung outward into operative position.

In testimony whereof I affix my signature, in the presence of two witnesses.

ALFRED RUCH.

Witnesses:
JACOB GEIGER,
JACOB MARTI.

Copies of this patent may be obtained for five cents each, by addressing the "Commissioner of Patents, Washington, D. C."